US007086905B1

(12) United States Patent
Chen

(10) Patent No.: US 7,086,905 B1
(45) Date of Patent: Aug. 8, 2006

(54) SLIM ALL-IN-ONE MEMORY CARD ADAPTER

(75) Inventor: Yuan-Hua Chen, Taoyuan (TW)

(73) Assignee: Kingconn Technology Co., Ltd., Taoyuan (TW)

( * ) Notice: Subject to any disclaimer, the term of this patent is extended or adjusted under 35 U.S.C. 154(b) by 0 days.

(21) Appl. No.: 11/322,557

(22) Filed: Jan. 3, 2006

(51) Int. Cl.
*H01R 24/00* (2006.01)
*H01R 4/48* (2006.01)

(52) U.S. Cl. ...................................................... 439/630

(58) Field of Classification Search ................ 439/630, 439/945, 946; 361/735, 737
See application file for complete search history.

(56) References Cited

U.S. PATENT DOCUMENTS 6,976,879 B1 * 12/2005 Shishikura et al. ......... 439/630
2006/0009078 A1 * 1/2006 Chen .......................... 439/630
2006/0009079 A1 * 1/2006 Chen .......................... 439/630

* cited by examiner

*Primary Examiner*—Tho D. Ta
(74) *Attorney, Agent, or Firm*—Rosenberg, Klein & Lee

(57) ABSTRACT

A slim all-in-one memory card adapter including a main body and ten contact fingers. The main body includes a slot portion at the internal side thereof and a receiving portion at the external side thereof. The slot portion includes recesses, and the receiving portion is defined by a U-shaped body formed by two side walls extending from the slot portion in such a way that the top and external sides thereof are open. A first bottom surface at a lower place and a second bottom surface at one side higher than the first bottom surface are provided between two side walls of the U-shaped body. Ten lugs are positioned on the first bottom surface. The lugs are dimensioned according to gaps of recessed edge connectors of MS (Memory Stick) series memory cards. The height h1 of the lugs is greater than the height h2 of the second bottom surface. The ten contact fingers are received within ten horizontal recesses. In this way, the conventional top cover can be removed while the specially designed main body is directly installed within a housing of digital products, thereby fulfilling the all-in-one function and the compact requirement.

3 Claims, 6 Drawing Sheets

40
521
524
511
60
51
50
52
525
521
523
522

SLIM ALL-IN-ONE MEMORY CARD ADAPTER

BACKGROUND OF THE INVENTION

1. Field of the Invention

The invention relates to a slim all-in-one memory card adapter, and more particularly to a slim adapter available for use by MS (Memory Stick) series memory cards.

2. Description of the Related Art

With the rapid development of electronic technology, digital products like PDAs, digital video cameras, digital cameras, electronic dictionaries, etc. have gradually gained a wide currency. These digital products are characterized by an expansion slot for the insertion of memory cards, including: CF (Compact Flash), SM (Smart Media), SD (Secure Digital) and MMC (Multimedia Card). In this way, the serviceability of the product can be improved.

The SONY Company has developed a special MS (Memory Stick) memory card. Thereafter, a MS Duo memory card in smaller dimensions was also developed. The dimensions of the MS memory card and the MS Duo memory card are 50.0 mm×21.5 mm×2.8 mm and 20 mm×31 mm×1.6 mm, respectively. The conventional memory card adapters were designed for only one memory card with certain specification, thereby resulting in restriction in use.

The applicant of the invention has disclosed a "Dual Purpose Adapter for MS and MS Duo Memory Card" (U.S. application Ser. No. 10/841,537 and TW 93201396) including a bottom base 10 and a top cover 20.

The bottom base 10 includes a slot 11 at the front end thereof. A notch 12 is made at the top of the bottom base 10. Both sides of the bottom base 10 include a clamping arm 13, respectively. Both of the clamping arms 13 have clamping members 131 that are positioned inwardly at opposing sides of the slot 11. A number of contact fingers 14 are disposed within the slot 11 and extended to the rear end of the bottom base 10. Meanwhile, engaging projections 15 are formed on both sides of the bottom base 10.

The top cover 20 is a metal housing at both sides of which locking holes 21 are formed corresponding to the engaging projections 15 of the bottom base 10. The surface of the top cover 20 is provided with a compression crossbar 22. An arched portion 221 is extended from the compression crossbar 22 through the notch 12 of the bottom base 10 into the slot 11. The compression crossbar 22 includes positioning portions 23 corresponding to the clamping members 131 of the clamping arm 13.

The above-mentioned configuration includes a bottom seat 10 made of plastic and the top cover 20 made of metal. Therefore, the configuration is complicated and the volume is large. Meanwhile, its thickness exceeds at least 6 mm. As a result, this configuration does not fit the digital products that make great demands on compactness since this configuration is unfavorable for the room design. Moreover, the MS memory card 300 und the MS Duo memory card 200 are inserted in a reverse direction, that is, their recessed edge connector 301, 201 (so-called gold fingers or contact pins) is directed upward. This does not correspond to the using habits of normal operators and thus leaves a lot to be desired.

SUMMARY OF THE INVENTION

A primary object of the invention is to provide a slim all-in-one memory card adapter in which the conventional top cover is removed for minimizing the dimensions of the whole structure. By use of lugs, the memory card adapter in accordance with the invention can be available for use by a group of memory cards consisting of MS、MS Duo、MS Pro及MS Pro Duo. In this way, a great compatibility of the memory card adapter to the digital products can be ensured.

In order to reach the above-mentioned object, the slim all-in-one memory card adapter in accordance with the invention includes:

a) a main body having a slot portion at the internal side thereof and a receiving portion at the external side thereof, the slot portion including ten horizontal recesses, the receiving portion being defined by a U-shaped body formed by two side walls extending from the slot portion in such a way that the top and external sides thereof are open, a first bottom surface at a lower place and a second bottom surface at one side higher than the first bottom surface being provided between two side walls of the U-shaped body, ten notches corresponding to the ten horizontal recesses being disposed on the first bottom surface, ten lugs being positioned at the external side of the notches, respectively, the lugs being dimensioned according to gaps of recessed edge connectors of MS (Memory Stick) series memory cards, the height h1 of the lugs being greater than the height h2 of the second bottom surface, and b) ten contact fingers being introduced into the ten horizontal recesses, respectively, the contact fingers each being formed with an upper elastic portion upward bent at the external side thereof, the top end of the upper elastic portion being located at a height larger than the height h1 of the lugs and the height h2 of the second bottom surface.

BRIEF DESCRIPTION OF THE FIGS.

Figure 5:
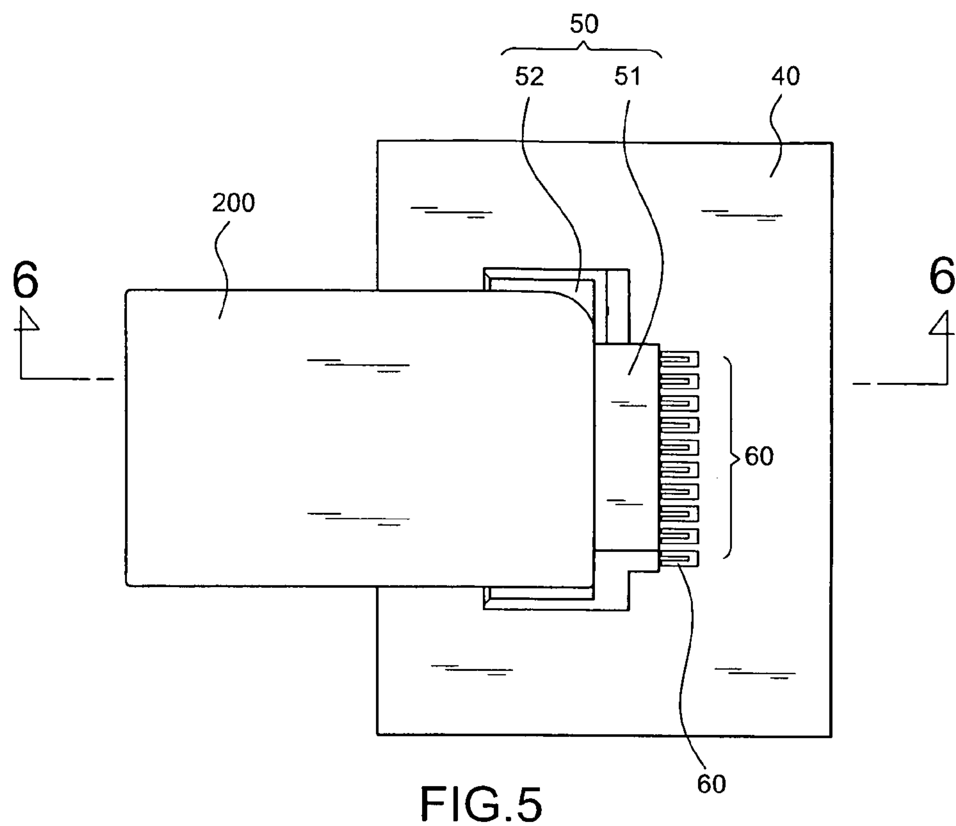
FIG. 5 is a top view of a slim all-in-one memory card adapter in accordance with the invention in which an MS Duo memory card is inserted.
Figure 6:
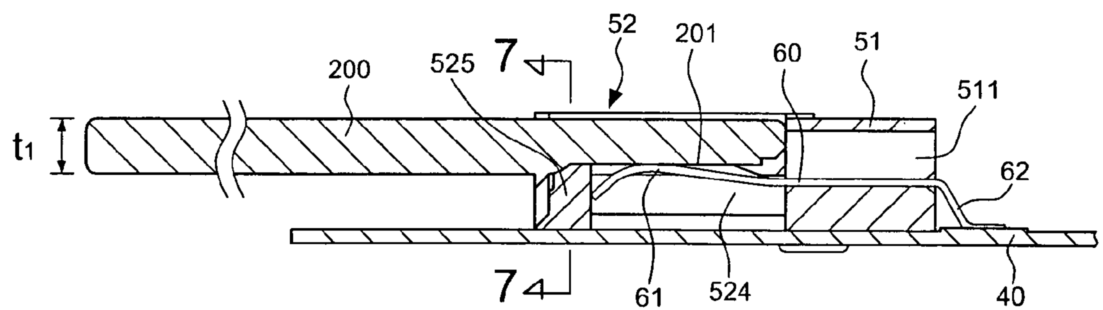
Figure 7:
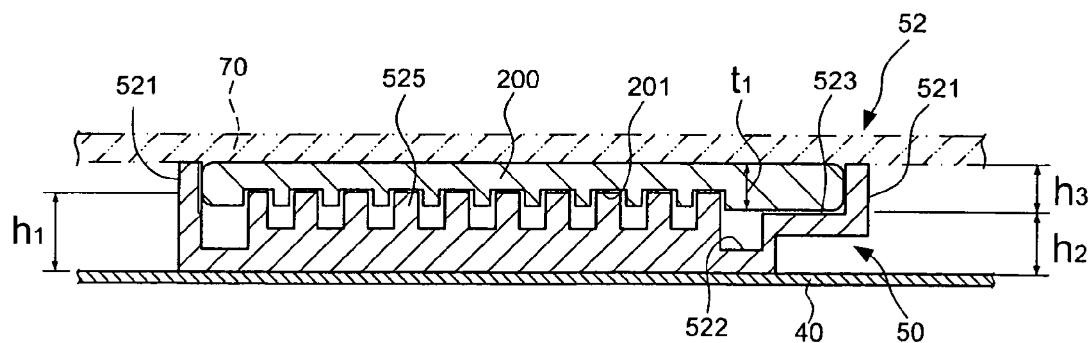
Figure 8:
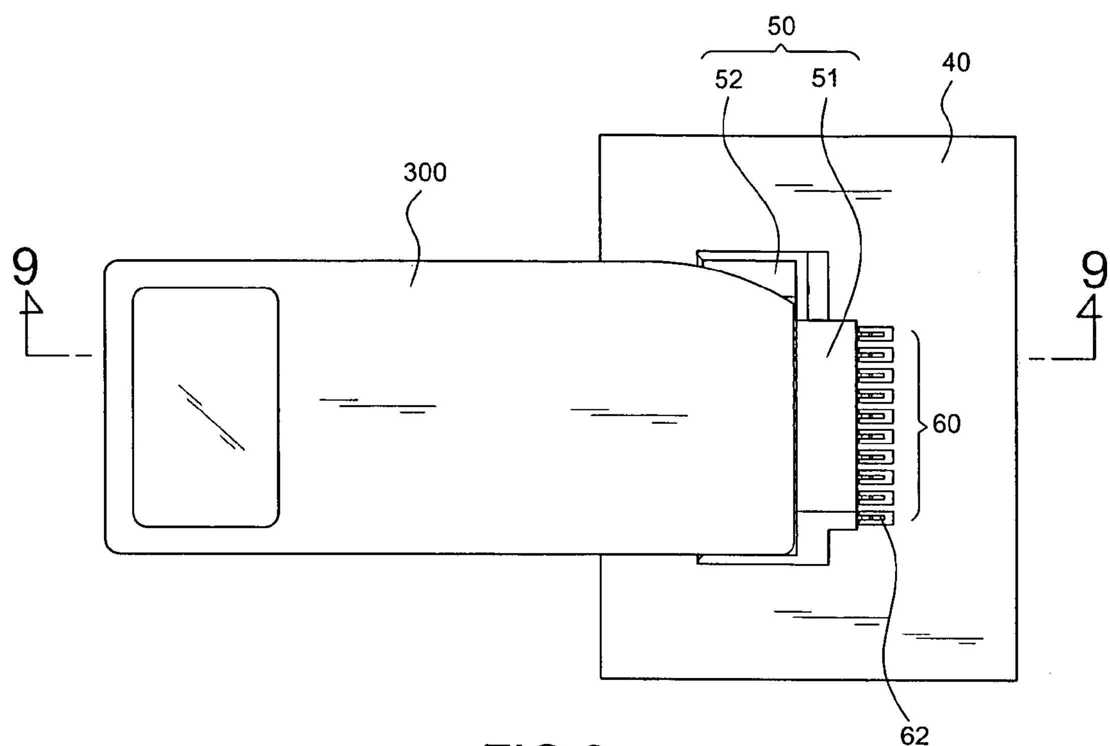
Figure 9:
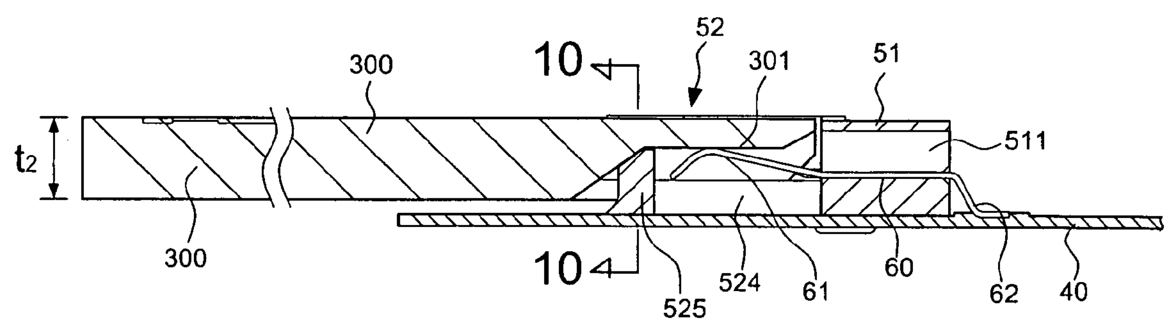
Figure 10:
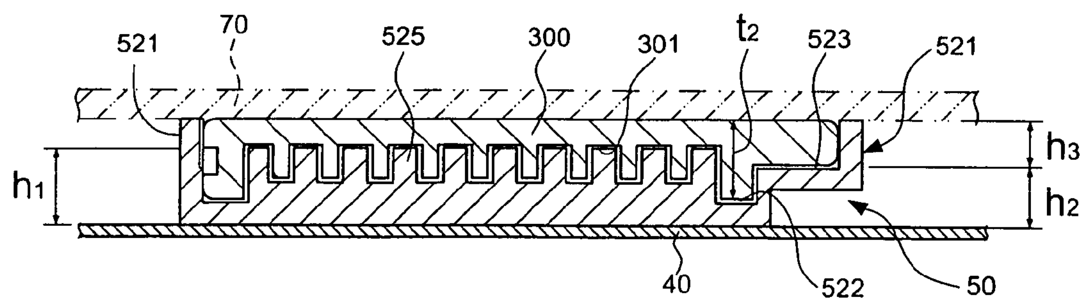

FIG. 6 a cutaway view taken along the lines of 6—6 in FIG. 5;

FIG. 7 a cutaway view taken along the lines of 7—7 in FIG. 6;

FIG. 8 a top view of a slim all-in-one memory card adapter in accordance with the invention in which a MS memory card is inserted FIG. 9 a cutaway view taken along the lines of 9—9 in FIG. 8; and FIG. 10 a cutaway view taken along the lines of 10—10 in FIG. 9.

DETAILED DESCRIPTION OF THE PREFERRED EMBODIMENT

Figure 1:
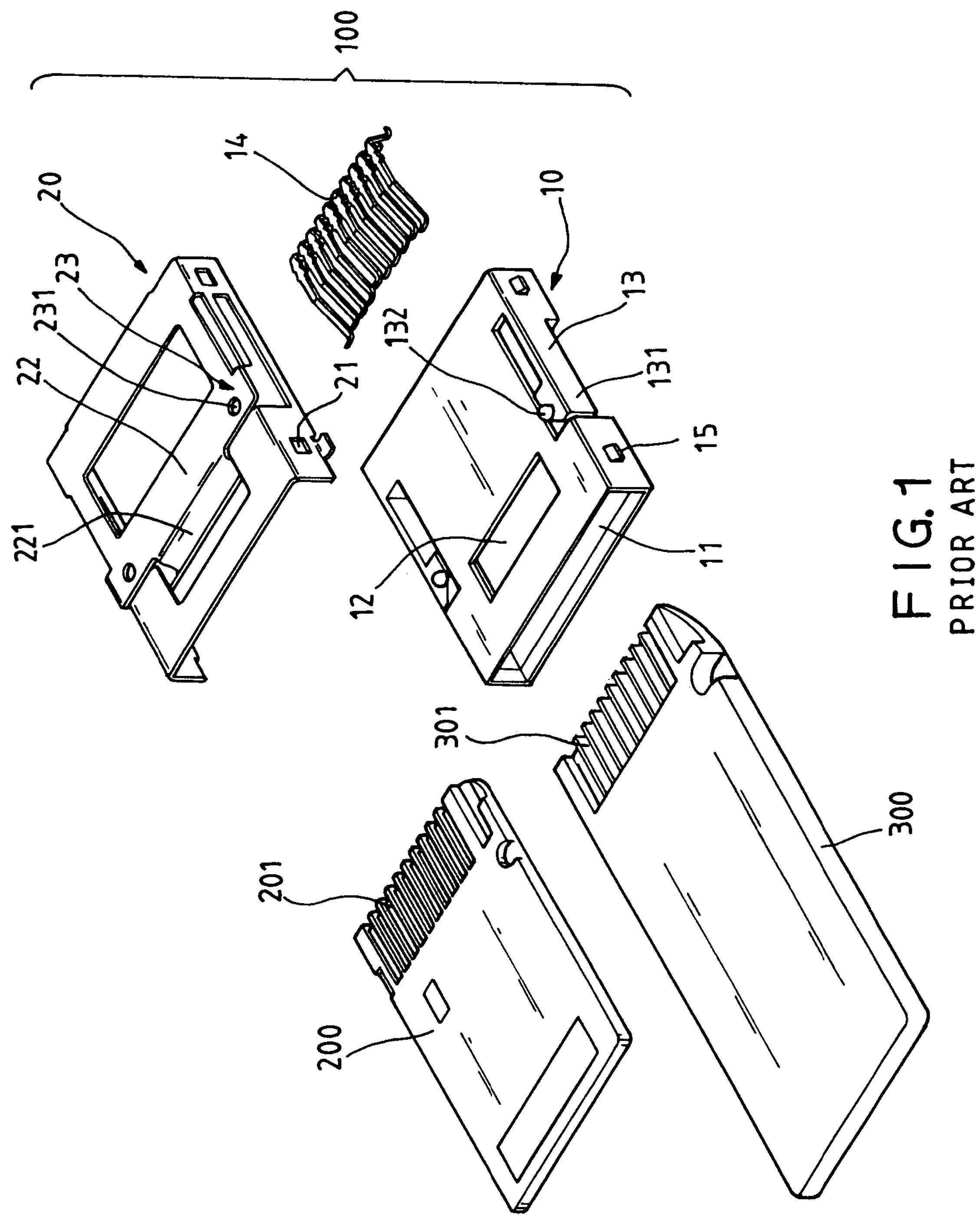
FIG. 1 is an exploded perspective view of a conventional two-in-one adapter for MS Duo memory cards and MS memory cards.
Figure 2:
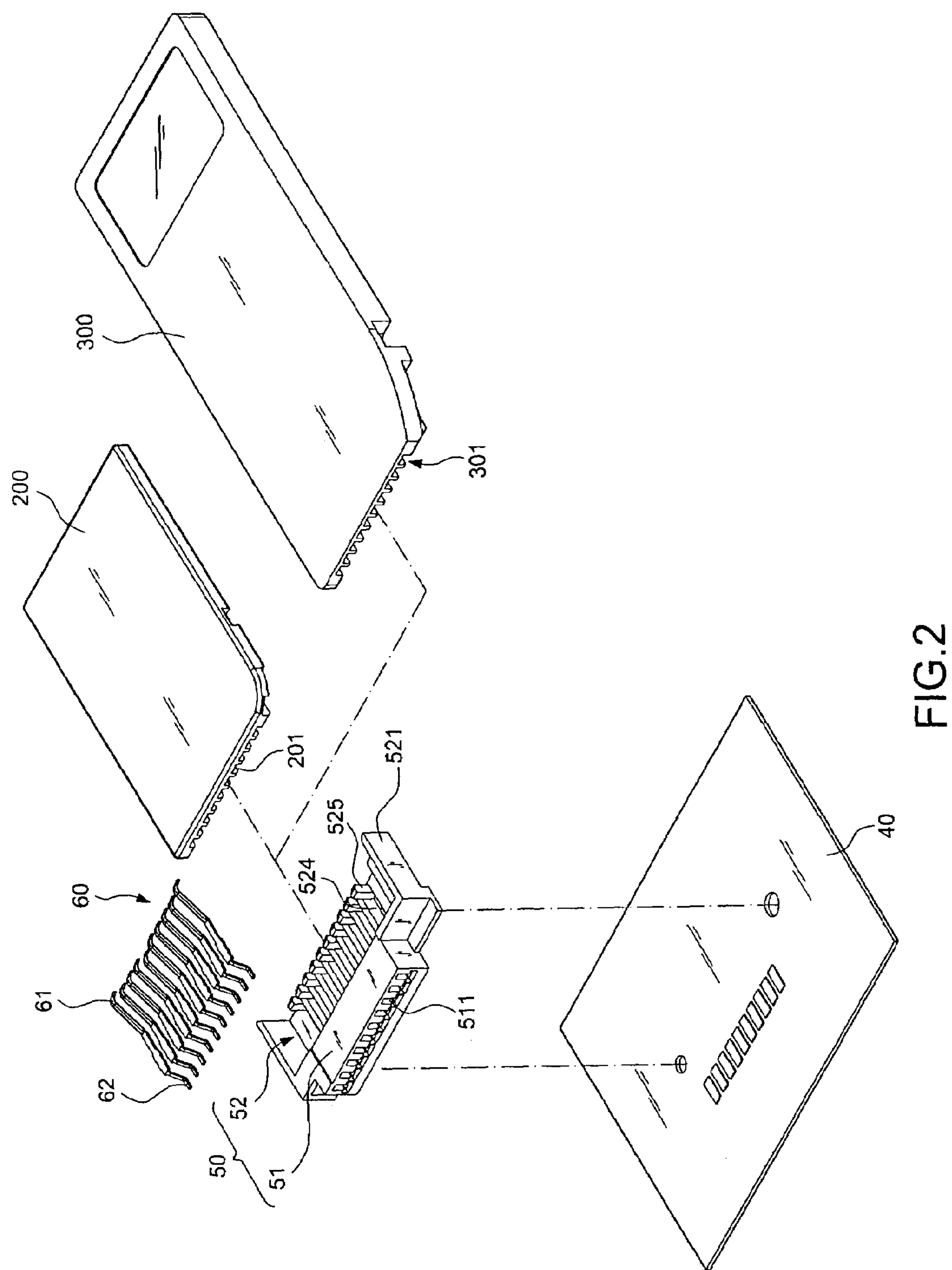
FIG. 2 is an exploded perspective view of the invention.

First of all, referring to FIG. 2, a slim all-in-one memory card adapter in accordance with the invention includes a main body 50 and ten contact fingers 60.

The main body 50 is made by plastic injection molding and includes a slot portion 51 at the internal side thereof and a receiving portion 52 at the external side thereof. The slot portion 51 includes ten horizontal recesses 511 for the insertion of contact fingers 60. The receiving portion 52 is defined by a U-shaped body formed by two side walls 521 extending from the slot portion 51 in such a way that the top and external sides thereof are open. A first bottom surface 522 at a lower place and a second bottom surface 523 at one side higher than the first bottom surface 522 are provided between two side walls 521 of the U-shaped body. Moreover, ten notches 524 corresponding to the ten horizontal recesses 511 and extending in the same direction as the contact fingers 60 are disposed on the first bottom surface 522. In addition, ten lugs 525 are positioned at the external side of the notches 524, respectively. The lugs 525 are dimensioned according to gaps of recessed edge connectors 201, 301 of MS series memory cards 200, 300.

The ten contact fingers 60 are introduced into the ten horizontal recesses 511, respectively. Meanwhile, each of the contact fingers 60 is formed with an upper elastic portion 61 upward bent at the external side thereof. The elastic portions 61 are received within the notches 524, respectively.

Figure 3:
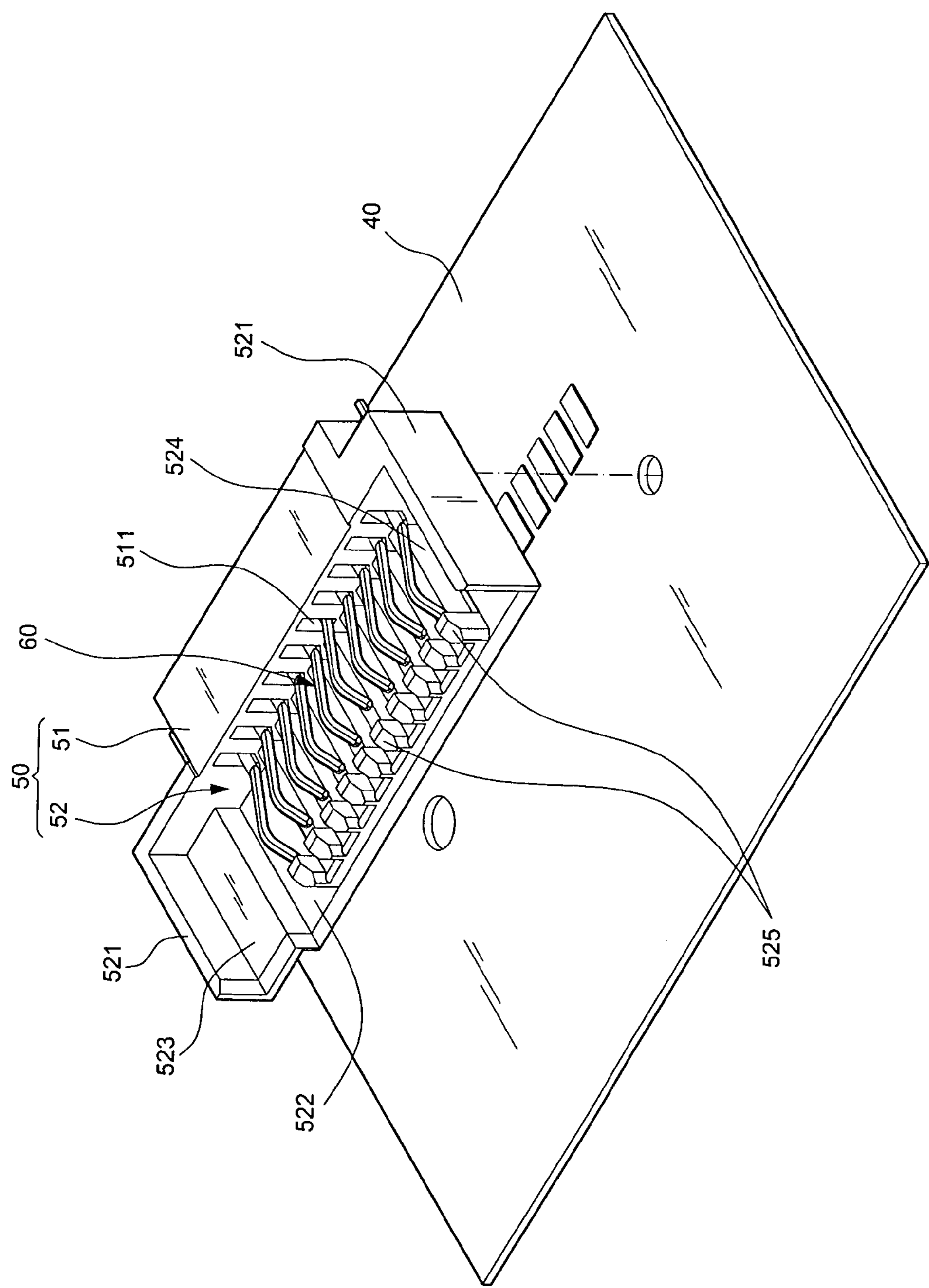
FIG. 3 is a perspective view of a main body in accordance with the invention seen from another side.
Figure 4:
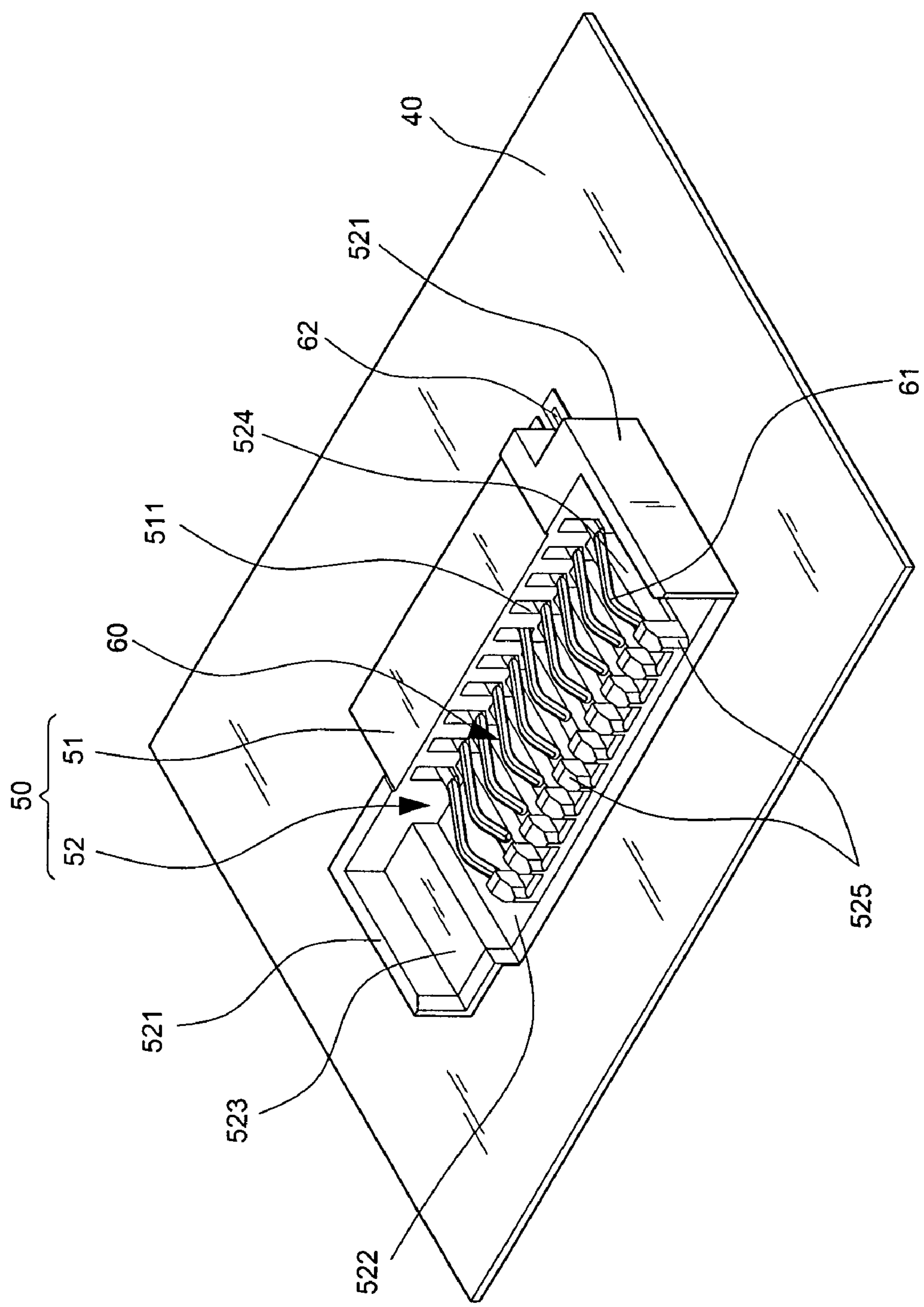
FIG. 4 is a perspective view of the main body in accordance with the invention that is mounted on a circuit board.

After the contact fingers 60, as shown in FIG. 3, are received within the main body 50, the main body 50 is mounted on a circuit board in such a way that lower elastic portions 62 bent downward at the internal side of the contact fingers 60 establish an electric connection to the circuit board (see FIG. 4). In this way, the main body 50 is available for the insertion of MS series memory cards 200, 300.

As shown in FIGS. 5, 6 and 7, the thickness t1 amounts to only 1.6 mm. When an MS Duo memory card 200 is placed into the receiving portion 52, the ten lugs 525 serve as end stop against which the bottom portion of the recessed edge connectors 201 of the MS Duo memory card 200 is pressed since the height h1 of the lugs 525 is greater than the height h2 of the second bottom surface 523. In this way, the external bottom side of the MS Duo memory card 200, where no contact pins of the recessed edge connector are mounted, can be received within the free space of the second bottom surface 523. In addition, the MS series memory cards 200 can be smoothly and flat placed into the receiving portion 52. Besides, the top side of the upper elastic portions 61 of the contact fingers 60 lies at a height greater than the height h1 of the lugs 525 and the height h2 of the second bottom surface 523. As a result, contact pins within the recessed edge connectors 201 of the MS series memory card 200 are in contact with the corresponding contact fingers 60 to establish an electric connection.

The slim all-in-one memory card adapter in accordance with the invention does not have a top cover. After the main body 50 is fixed on the circuit board 40, the main body 50 is directly installed within a housing 70 of the digital product shown by dash-dotted lines in FIG. 7. Therefore, the thickness and cost of the top cover can be saved to make the digital products slimmer. In order to achieve a smooth insertion and removal of the MS memory card 200, the height h3 from the second bottom surface 523 to the top rim of the side walls 521 must substantially exceed 1.6 mm and preferably lie between 1.7 and 1.8 mm. Meanwhile the total height h2+h3 of the main body 50 should not exceed 3.6 mm, thereby considerably reducing the thickness of the main body 50 in comparison to the conventional memory card adapter 100 having a minimal height of 6 mm. The most important is that the above-mentioned structure of the main body 50 is not only available for the insertion of a MS Duo memory card of small dimensions, as shown in FIGS. 5 through 7, but also for the insertion of a MS memory card of large dimensions, as shown in FIGS. 8 through 10. The MS memory card 300 has a thickness t2 of 2.8 mm and, therefore, has deeper gaps of the recessed edge connectors 301. Thus, the bottom side of the MS memory card 300 is in contact with the first bottom surface 522 while the recessed portion at the external bottom side of the MS memory card 300, where no contact pins are mounted, are in contact of the second bottom surface 523. Accordingly, the single main body 50 can receive both MS Duo memory card 200 and MS memory card 300. Furthermore, MS Pro memory cards correspond to MS memory cards in dimensions. As a result, the slim all-in-one memory card adapter in accordance with the invention is applicable to at least four memory cards. Meanwhile, it is the slimmest one in the market. Therefore, this invention can be regarded as being patentable.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A slim all-in-one memory card adapter, comprising:

a) a main body having a slot portion at the internal side thereof and a receiving portion at the external side thereof, the slot portion including ten horizontal recesses, the receiving portion being defined by a U-shaped body formed by two side walls extending from the slot portion in such a way that the top and external sides thereof are open, a first bottom surface at a lower place and a second bottom surface at one side higher than the first bottom surface being provided between two side walls of the U-shaped body, ten notches corresponding to the ten horizontal recesses being disposed on the first bottom surface, ten lugs being positioned at the external side of the notches, respectively, the lugs being dimensioned according to gaps of recessed edge connectors of MS (Memory Stick) series memory cards, the height (h1) of the lugs being greater than the height (h2) of the second bottom surface, and b) ten contact fingers being introduced into the ten horizontal recesses, respectively, the contact fingers each being formed with an upper elastic portion upward bent at the external side thereof, the top end of the upper elastic portion being located at a height larger than the height (h1) of the lugs and the height (h2) of the second bottom surface.

2. The slim all-in-one memory card adapter as recited in claim 1 wherein lower elastic portions bent downward at the internal side of the contact fingers establish an electric connection to the circuit board positioned under the main body.

3. The slim all-in-one memory card adapter as recited in claim 1 wherein the receiving portion of the main body can receive a group of memory cards consisting of MS, MS Duo, MS Pro, and MS Pro Duo, and wherein the recessed edge connector (consisting of contact pins) at the front end of the memory cards is electrically connected to the upper elastic portions of the contact fingers.

* * * * *